(12) United States Patent
Bertin

(10) Patent No.: US 9,528,858 B2
(45) Date of Patent: Dec. 27, 2016

(54) INDUCTIVE SENSOR

(71) Applicant: SEMICONDUCTOR COMPONENTS INDUSTRIES, LLC, Phoenix, AZ (US)

(72) Inventor: Jacques Bertin, Pocatello, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 328 days.

(21) Appl. No.: 14/079,601

(22) Filed: Nov. 13, 2013

(65) Prior Publication Data

US 2014/0132253 A1 May 15, 2014

Related U.S. Application Data

(60) Provisional application No. 61/725,490, filed on Nov. 13, 2012.

(51) Int. Cl.
  *G01B 7/30* (2006.01)
  *G01B 7/14* (2006.01)
  *G01D 5/20* (2006.01)

(52) U.S. Cl.
  CPC .......... *G01D 5/2086* (2013.01); *G01D 5/2053* (2013.01)

(58) Field of Classification Search
  CPC .................................. G01B 7/00; G01B 7/30
  USPC ....................................... 324/207.15, 207.25
  See application file for complete search history.

(56) References Cited

U.S. PATENT DOCUMENTS

| | | | |
|---|---|---|---|
| 4,253,079 A * | 2/1981 | Brosh | 336/84 C |
| 6,236,199 B1 | 5/2001 | Irle et al. | |
| 7,372,261 B2 * | 5/2008 | Choi et al. | 324/253 |
| 2011/0101968 A1 * | 5/2011 | Brands et al. | 324/207.17 |

* cited by examiner

*Primary Examiner* — Bot Ledynh
(74) *Attorney, Agent, or Firm* — Conley Rose, P.C.

(57) ABSTRACT

In one embodiment, an electronic device includes an excitation control; a first excitation element coupled to the excitation control; a second excitation element coupled to the excitation control; a target positioned near the first and second excitation elements and within the electromagnetic fields generated by the first and second excitation elements; a receiving element positioned near the target and within the electromagnetic fields generated by the first and second excitation elements; and a signal processor coupled to the receiving element and coupled to the excitation control.

12 Claims, 7 Drawing Sheets

US 9,528,858 B2

INDUCTIVE SENSOR

PRIORITY CLAIM TO PRIOR PROVISIONAL FILING

This non-provisional application claims priority to prior filed U.S. Provisional Application Ser. No. 61/725,490 entitled "INDUCTIVE SENSOR" filed on Nov. 13, 2012, and having common inventor Jacques Bertin.

BACKGROUND

The present disclosure relates, in general, to electronics, and more particularly, to electronic devices, apparatuses, systems, and methods for sensing a position, an angular position, or a linear position of a target.

Inductive position sensors are widely used in numerous industries and in a number of different applications. For example, in the automotive industry, inductive position sensors in vehicles can be used in to detect the position of the acceleration pedal, brake pedal, throttle, suspension, steering wheel, headlights, actuators, or any of various other components of the engine, transmission or vehicle. Similarly, inductive position sensors in a factory can be used to detect the position of levers, rotors, shafts, or other mechanical equipment. Conventional inductive position sensors typically include a single excitation coil, several receiver coils inductively coupled to the excitation coil, and a target coil or target element. The target element can be attached to a movable part, or can itself be a moveable part, for which it is desirable to know the position of The target element is designed to affect the inductive coupling between the excitation coil and the receiving coils as a function of its position. Circuitry is provided to compare the relative amplitudes between the several receiving coils.

A conventional inductive position sensor will now be described with reference to FIG. 1. Referring to FIG. 1, an inductive position sensor 100 is shown. The inductive position sensor 100 typically includes an AC source 102 coupled to a single excitation coil 104. The AC source 102 provides an alternating current to excitation coil 104 which in turn generates an electromagnetic field. Receiver coils 108 and 110 are configured such that the electromagnetic field generated by excitation coil 104 induces AC signals within receiver coils 108 and 110. A target element or coupler element 106 is placed within the electromagnetic field and is configured to affect the electromagnetic field as a function of its angular position θ. The configuration and position of target element 106 and receiver coils 108 and 110 is such that the AC signals induced in receiver coils 108 and 110 are different and such that both signals vary as a function of the angular position of target element 106. The angular position θ of target element 106 can be determined by relative amplitude measurement of the signal induced in receiver coil 108 compared to the signal induced in receiver coil 110. The relative amplitude measurement and determination of the angular position θ of target element 106 typically is performed by a signal processor 116.

The accuracy of position sensor 100 requires the amplitudes of signals to be measured precisely. Conventionally, however, the amplitudes of the signals induced within receiver coils 108 and 110 are small. For example, the amplitudes of the signals excited within receiver coils 108 and 110 can be hundredths or thousandths of the amplitude of excitation signal generated in excitation coil 104. A 5V excitation signal in excitation coil 104 could, for example, result in 10 mV signals, or smaller, being induced within receiver coils 108 and 110. In order to measure and compare the amplitudes of the two signals accurately, amplifiers 112 and 114 are used to amplify the two signals before processing them with signal processor 116. The use of two parallel channels having two separate amplifiers, however, introduces errors into the sensor system due to amplification mismatch. Conventional systems which use a single amplifier by time-division multiplexing both signals suffer from error introduced by a time mismatch and additionally suffer from slower processing speeds. Solutions to the both amplification mismatch and time mismatch have generally required complex circuitry increasing both the size and cost of the sensor. Accordingly, it is desirable to have an inductive position sensor which eliminates time and amplification mismatch. Additionally, it is also beneficial for the sensor to be small, cost effective and simple.

BRIEF DESCRIPTION OF THE DRAWINGS

Embodiments are illustrated by way of example and are not limited in the accompanying figures.

Figure 1:
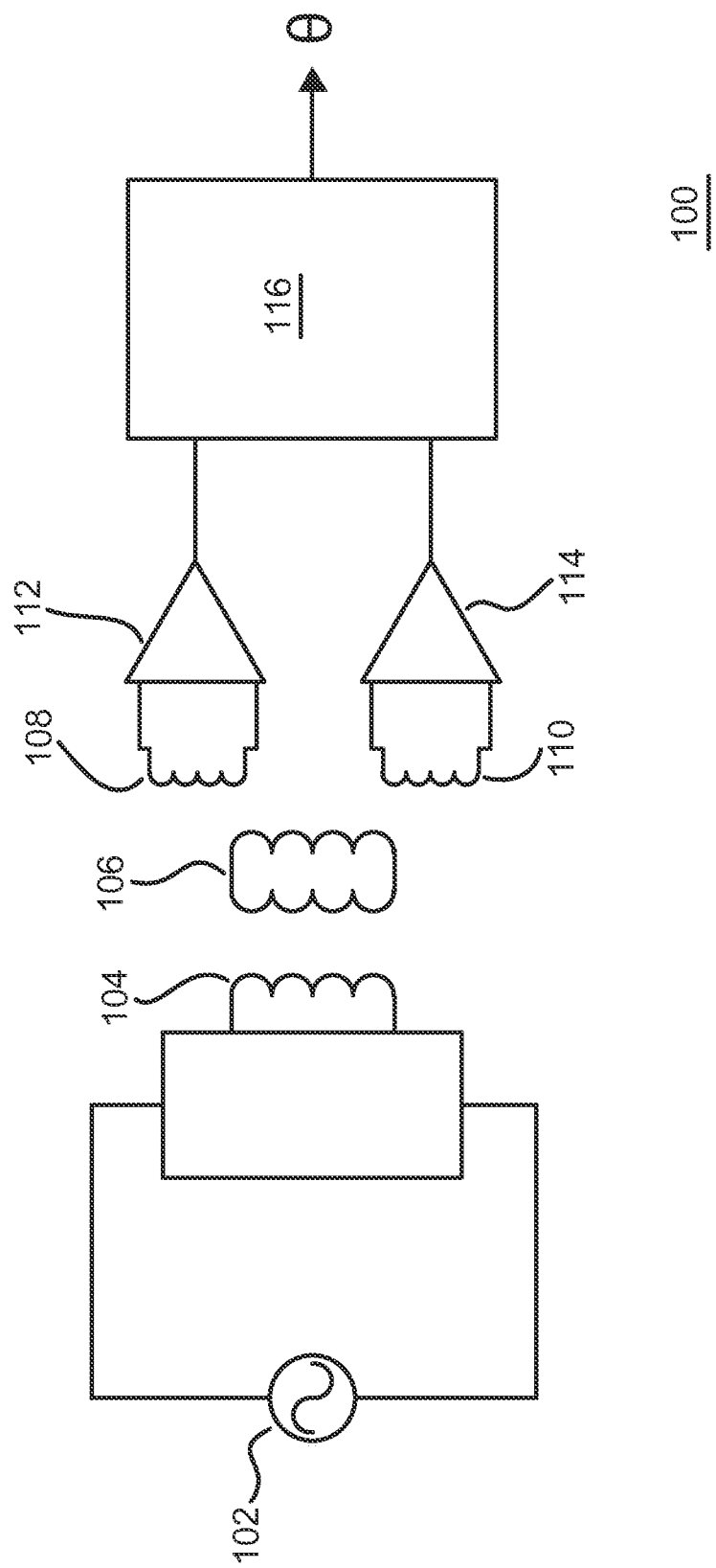
FIG. 1 schematically illustrates an inductive sensor used in a conventional electronic device.

For simplicity and clarity of the illustration, elements in the figures are not necessarily to scale, are only schematic and are non-limiting, and the same reference numbers in different figures denote the same elements, unless stated otherwise. Additionally, descriptions and details of well-known steps and elements are omitted for simplicity of the description. It will be appreciated by those skilled in the art that the words "during", "while", and "when" as used herein relating to circuit or system operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there may be minor variances that prevent the values or positions from being exactly as stated. It is well established in the art that variances of up to at least ten percent (10%) are reasonable variances from the ideal goal that may be described. When used in reference to a state of a signal, the term "asserted" means an active state of the signal and "inactive" means an inactive state of the signal. The actual voltage value or logic state (such as a "1" or a "0") of the signal depends on whether positive or negative logic is used. Thus, "asserted" can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used.

For simplicity and clarity of illustration, formulas and mathematical functions are used to represent signals and fields, however, one of ordinary skill in the art will understand that in practice, actual signals can differ, sometimes considerably, from their mathematical description due to component limitations, physical limitations, noise, errors, environmental influences, etc. Therefore, one of ordinary skill in the art will appreciate that the formulas and mathematical functions described herein are merely illustrative and are generally approximate. The terms "first", "second", "third" and the like in the Claims or/and in the Detailed Description of the Drawings, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. Methods, techniques, apparatuses, materials, circuits, devices, components, and systems as known by one of ordinary skill in the art may not be discussed in detail but are intended to be part of the enabling description where appropriate. While numerical ranges and mathematical functions are described herein to provide a better understanding of particular embodiments, after reading this specification, skilled artisans will appreciate that values outside the numerical ranges and substitute mathematical functions may be used without departing from the scope of the present invention.

The terms "comprises," "comprising," "includes," "including," "has," "having," or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B may be satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read such that the plurals include one or at least one and the singular also includes the plural, unless it is clear that it is meant otherwise. For example, when a single item is described herein, more than one item may be used in place of a single item. Similarly, where more than one item is described herein, a single item may be substituted for that more than one item.

Inductive position sensors according to various embodiments of the invention will now be described in greater detail with references to FIGS. 2-6.

Figure 2:
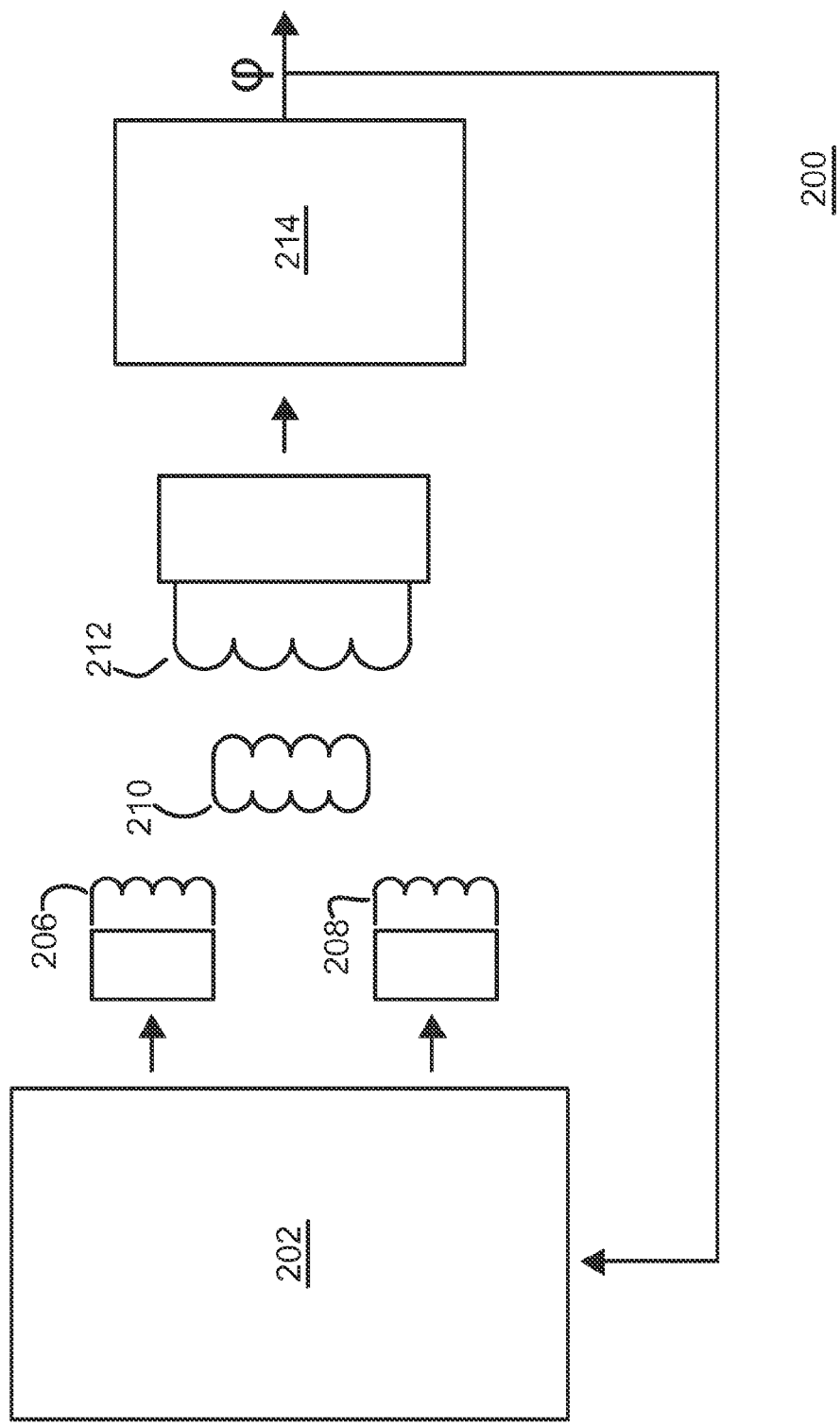
FIG. 2 schematically illustrates an inductive sensor in accordance with an embodiment of the present invention.

FIG. 2 schematically illustrates an inductive sensor 200 in accordance with one embodiment. In this embodiment, inductive sensor 200 includes an excitation control 202. Excitation control 202 can receive a variable parameter 'ϕ' from an output of a signal processor, signal processing component, signal processing block or signal processing unit 214. Excitation control 202 can use variable parameter 'ϕ' to create two signals which can drive excitation coils or excitation elements 206 and 208. According to the present embodiment and for the purposes of illustration, inductive sensor 200 has two excitation elements, however, it is not a limitation that inductive sensor 200 have two excitation elements. For example, in another embodiment, inductive sensor 200 may have more than two excitation elements. Excitation elements 206 and 208 are configured to receive signals from excitation control 202 and transmit those signals via electromagnetic radiation. Each excitation element can generate an electromagnetic field corresponding to the signal it receives from excitation control 202. According to one embodiment, each signal can be a function of variable parameter 'ϕ'. According to one embodiment, each signal can be chosen such that a particular result occurs when the value of the variable parameter 'ϕ' is equal to a value representing a characteristic or property which the sensor is designed to sense. As a non-limiting example, according to the present two excitation element sensor, the signal provided to excitation element 206 can be approximately represented mathematically by the function $E(\phi)=\sin(4\phi+\pi/2)=\cos(4\phi)$ and the signal provided to excitation element 208 can be approximately represented mathematically by the function $F(\phi)=\cos(4\phi+\pi/2)=-\sin(4\phi)$, where 'ϕ' represents a variable parameter provided to excitation control 202 by signal processor 214. It is noted that virtually numberless variations of different signals could be provided to excitation elements, therefore it is not a limitation of the invention that any specific signal or signals be used. One of ordinary skill in the art will appreciate that different signals may be chosen based on a variety of different sensor configurations including but not limited to: the number of excitation elements, the shape of the excitation elements, the position of the excitation elements, etc.

According to one embodiment, excitation elements 206 and 208 can comprise one or more conductive coils, shapes, planar coils, planar shapes, or conductive traces of lines and curves on a printed circuit board (PCB), multilayer PCB, or stator. In one embodiment, excitation elements 206 and 208 can comprise a series of conductive traces or electrically conductive pathways on a multilayer PCB. In one embodiment, one portion of excitation element 206 and one portion of excitation element 208 can be placed on a first layer of a multiplayer PCB while a second portion of excitation element 206 and a second portion of excitation element 208 can be placed on a second layer of a multilayer PCB. In another embodiment, excitation elements 206 and 208 are placed on separate layers of a multilayer printed circuit board. The myriad of variables, such as shape, geometry, orientation, position, division across multiple layers, or winding direction of excitation elements 206 and 208 can be configured based on known parameters of the inductive sensor and is discussed below in reference to FIG. 4A.

A target element, target or rotor 210 is placed in proximity to excitation elements 206 and 208. Target 210 can include a closed conductive loop or multiple conductive loops. The conductive loop or loops can be hollow or filled. The conductive loop or loops of target 210 can be configured to substantially match or resemble the geometry and shape of excitation elements 206 and 208. Target 210 can be coupled to a movable part for which inductive sensor 200 is designed to sense or can be integral with a movable part for which inductive sensor 200 is designed to sense. According to one embodiment, target 210 is placed substantially parallel to excitation elements 206 and 208 and is configured to be rotatable about a central axis which is substantially common to excitation elements 206 and 208. As a non-limiting example, and for purposes of illustration, the angular position of target 210 about its axis will be denoted by the symbol 'θ', and will be the property or characteristic of the system for which inductive sensor 200 is designed to sense. Target 210 can be configured to affect the electromagnetic fields generated by excitation elements 206 and 208 as a function of its angular position 'θ'. The effect which target 210 has on the electromagnetic fields can be described by its coupling function. The coupling function occurs as a result of eddy currents which can be induced in target 210 based on the geometry, shape, material and position of target 210 relative to the geometry, shape and position of excitation elements 206 and 208 and thus is a function of the angular position 'θ' of target 210. According to one embodiment the coupling function of target 210 can be different for each electromagnetic field because excitation elements 206 and 208 can be angularly offset from one another. According to one embodiment the coupling function of target 210 with excitation element 206 can be approximately represented mathematically by the function, $G(\theta)=\sin(4\theta)$. According to one embodiment, the coupling function of target 210 with excitation element 208 can be approximately represented mathematically by the function, $H(\theta)=\cos(4\theta)$. It is noted that virtually numberless variations of different coupling functions could be designed and provided by target 210, and therefore it is not a limitation of the invention that any specific coupling function or functions be used. One of ordinary skill in the art will recognize that different coupling functions may be chosen based on a variety of different configurations including but not limited to: the number of excitation elements, the shape of the excitation elements, the position of the excitation elements, the geometry of target 210, the material of target 210, the position of target 210, etc.

A receiving coil or receiving element 212 can be placed in proximity to target 210 and positioned within the electromagnetic fields generated by excitation elements 206 and 208. According to one embodiment, receiving element 212 can be placed on a layer of the same printed circuit board as excitation elements 206 and 208. However, receiving element 212 can also be placed separate from excitation elements 206 and 208. Receiving element 212 can be configured to generate a signal in response to induction by the electromagnetic fields generated by excitation elements 206 and 208 and altered by target 210. According to the above description, the signal generated in receiving element 212 can be approximately represented by the function, $J(\phi, \theta)=G(\theta)E(\phi)+H(\theta)F(\phi)=\sin(4\theta)\cos(4\phi)-\cos(4\theta)\sin(4\phi))=\sin(4\theta-4\phi)$, where 'φ' is the variable parameter provided by signal processor 214 and 'θ' represents the angular position of target 210. According to this embodiment, the signal generated in receiving element 212 approaches zero as the value of the variable parameter φ approaches the value of the angular position θ of target 210. According to one embodiment, receiving element is configured to output a signal to a signal processor 214.

Signal processor 214 can be configured to receive a signal from receiving element 212 and process the signal. According to one embodiment, signal processor 214 includes an amplifier. Because the illustrated embodiment includes a single channel and signal to amplify, inductive sensor 200 may be free from amplification mismatches and/or time mismatches associated with conventional approaches. Based on the signal received from receiving element 212, signal processor 214 can determine how close the value of variable parameter 'φ' is to the value of the angular position 'θ' of target 210. Based on this determination, signal processor 214 can be configured to adjust the value of variable parameter 'φ' and provide the adjusted variable parameter 'φ' to excitation control 202, making inductive sensor 200 a closed loop system. The value of adjusted variable parameter 'φ' can be chosen to effect an adjustment in the signal received from receiving element 212. According to one embodiment, signal processor 214 can continue to make adjustments to variable parameter 'φ' until the value of the signal received from receiving element 212 reaches a set value or is within a certain range or set range of values. According to the present embodiment, the set range can be values close to zero which, according to the above description, indicates that the value of variable parameter 'φ' is close to the value of angular position 'θ' of target 210. However, as discussed previously, various other excitation signals, excitation element shapes, coupling functions, target shapes and such could be chosen and configured such that inductive sensor 200 converges to a set value or set range of values not centered around zero. Furthermore, it is not a limitation of inductive sensor 200 that the system settle or converge to a set value or set range. According to another embodiment, inductive sensor 200 can be configured to provide excitation control 202 with various variable parameters 'φ' representing a set of sampling values. The resulting signals received by signal processor 214 and their values can be used by signal processor 214 to calculate or extrapolate the angular position 'θ' of target 210.

In addition to the above, signal processor 214 can also be configured to apply additional processing techniques to the signal received by receiving element 212 in order to adjust for known errors, reduce noise, eliminate harmonics, filter unwanted electromagnetic interference, etc.

Signal processor 214 can also be configured to output the value of variable parameter 'φ', or another signal or value, such as a signal or value representative of the approximate value of the angular position 'θ' of target 210.

Figure 3:
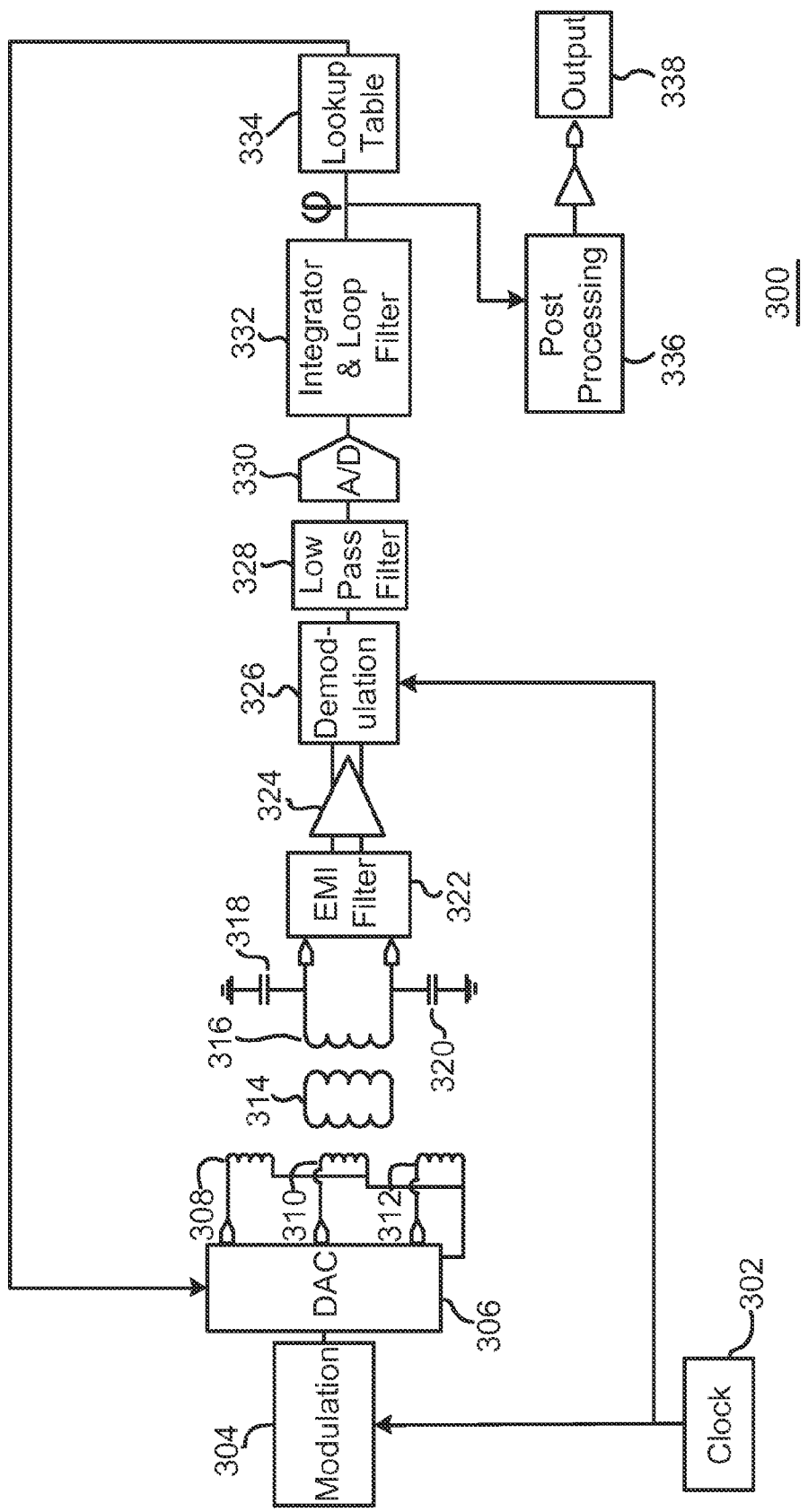
FIG. 3 schematically illustrates an inductive sensor in accordance with an embodiment of the present invention.

FIG. 3 schematically illustrates an inductive sensor 300 in accordance with an embodiment. FIG. 3 provides a more detailed view and implementation of an embodiment of an inductive sensor, however, one of ordinary skill in the art will recognize that there are multiple ways to configure an inductive sensor according to the principles described herein. Thus, FIG. 3 is merely illustrative of one embodiment.

Inductive sensor 300 includes a clock or RC clock 302. Clock 302 can be used to generate a signal, for example at 4 MHz, that can be used for both the modulation 304 of signals going to excitation coils or excitation elements 308, 310, and 312, and demodulation 326 of the signal received from receiver coil or receiver element 316.

A digital-to-analog converter or DAC 306 can provide modulated signals to excitation elements 308, 310, and 312. It is not a limitation that inductive sensor 300 have three excitation elements. In another embodiment, inductive sensor 300 may have less than three excitation elements, and in another embodiment, inductive sensor 300 may have more than three excitation elements, however, for purposes of illustration, a three excitation element sensor is described here. Excitation elements 308, 309, and 312 are configured to receive signals from DAC 306 and transmit those signals via electromagnetic radiation. Each excitation element can generate an electromagnetic field corresponding to the signal it receives from DAC 306. According to one embodiment, DAC 306 can be configured to receive a variable parameter '$\phi$' and each signal provided by DAC 306 can be a function of the variable parameter '$\phi$'. According to one embodiment, each signal can be chosen such that a desired result occurs when the value of the variable parameter '$\phi$' is equal to or approximately equal to a value representing a characteristic or property which the sensor is designed to sense. For example, similar to the inductive sensor described in FIG. 2, the signals of the excitation elements 308, 310, and 312 can be chosen such that the signal received by the receiver element would approach a predetermined value or range of values as the value of variable parameter '$\phi$' nears a value representing the angular position of a target. In one embodiment, the predetermined value or range of values can be zero or a range of values near zero.

As a non-limiting example, according to the present three excitation element sensor, the signal provided to excitation element 308 can be approximately represented mathematically by the function $E(\phi)=\sin(\phi+\pi/2)$. The signal provided to excitation element 310 can be approximately represented mathematically by the function $F(\phi)=\sin(\phi+2\pi/3+\pi/2)$. And the signal provided to excitation element 312 can be approximately represented mathematically by the function $G(\phi)=\sin(\phi-2\pi/3+\pi/2)$. In each of these functions, '$\phi$' represents a variable parameter received by DAC 306. It is noted that virtually numberless variations of different signals could be provided to excitation elements in order to achieve the same result as the present embodiment, therefore it is not a limitation of the invention that any specific signal or signals be used. One of ordinary skill in the art will recognize that different signals may be chosen or designed based on a variety of different configurations including but not limited to: the number of excitation elements, the shape or geometry of the excitation elements, the position of the excitation elements, the shape or geometry of a target, the position of a target, the material of the excitation elements or the target, etc.

In one embodiment, excitation elements 308, 310, and 312 can comprise one or more conductive coils, shapes, planar coils, planar shapes, or conductive traces of lines and curves having periodic bends on a printed circuit board (PCB) or a multilayer PCB. In one embodiment, excitation elements 308, 310, and 312 can comprise a series of conductive traces or electrically conductive pathways on a multilayer PCB. In one embodiment, portions of excitation elements 308, 310, and 312 are placed on various layers of a multilayer PCB. The geometry, shape, orientation, position and winding direction of excitation elements 308, 310, and 312 can be configured based on known or desired parameters of the inductive sensor. In one embodiment, excitation elements 308, 310, 312 are angularly offset from one another.

A target or rotor 314 is placed in proximity to excitation elements 308, 310, and 312. Target 314 can include a closed conductive loop or multiple conductive loops. The conductive loop or loops can be hollow or filled. The conductive loop or loops of target 314 can be configured to match or resemble the geometry or shape of excitation elements 308, 310, and 312. Target 314 can be coupled to a movable part for which sensor is designed to sense or can be integral with a movable part for which a sensor is designed to sense. According to one embodiment, target 314 is placed substantially parallel to excitation elements 308, 310, and 312 and is configured to be rotatable about a central axis which is substantially common to excitation elements 308, 310, and 312. As a non-limiting example, and for purposes of illustration, the angular position of target 314 about its axis will be denoted by the symbol '$\theta$', and will be the property or characteristic of the system which inductive sensor 300 is designed to sense. Target 314 can be configured to affect the electromagnetic fields generated by excitation elements 308, 310, and 312 as a function of its angular position '$\theta$'. The effect which target 314 has on the electromagnetic fields can be described by its coupling function. The coupling function results from, among other things, eddy currents which are induced in target 314 based on the geometry, shape, material, and position of target 314 relative to the geometry, shape and position of excitation elements 308, 310, and 312 and thus the coupling function is a function of the angular position '$\theta$' of target 314. According to one embodiment the coupling function of target 314 can be different for each electromagnetic field because excitation elements 308, 310, and 312 can be offset from one another. According to one embodiment the coupling function of target 314 with excitation element 308 can be approximately represented mathematically by the function: $H(\theta)=\sin(\theta)$. According to one embodiment the coupling function of target 314 with excitation element 310 can be approximately represented mathematically by the function: $J(\theta)=\sin(\theta+2\pi/3)$. According to one embodiment the coupling unction of target 314 with excitation element 312 can be approximately represented mathematically by the function: $(\theta)=\sin(\theta-2\pi/3)$. It is noted that virtually numberless variations of different coupling function could be designed and provided by target 314, therefore it is not a limitation of the invention that any specific design or coupling function or functions be used. One of ordinary skill in the art will recognize that different coupling functions may be chosen based on a variety of different configurations including but not limited to: the number of excitation elements, the material of excitation elements, the shape of the excitation elements, the position of the excitation elements, the shape of target 314, the material of target 314, the position of target 314, etc.

A receiving coil or receiving element 316 can be placed in proximity to target 314 and positioned within electromagnetic fields generated by excitation elements 308, 310, and 312. According to one embodiment, receiving element 316 can be placed on a layer of the same printed circuit board as excitation elements 308, 310, and 312. However, receiving element 316 can also be placed separate from excitation elements 308, 310, and 312. Receiving element 316 can be configured to generate a signal in response to induction by the electromagnetic fields generated by excitation elements 308, 310, and 312 and altered by target 314. The coupling function between receiving element 316 and target 314 can be approximately fixed due to the geometry, material or shape of receiving element 316. For example, receiving element 316 can be a planar coil in a spiral shape. Furthermore, capacitors 318 and 320 can be coupled to receiving element 316 in order to realize a resonant circuit. According to the above description, the signal generated in receiving element 212 can be approximately represented mathematically by the function $L(\phi, \theta)=H(\theta)E(\phi)+J(\theta)F(\phi)+K(\theta)G(\phi))=\sin(\theta)\sin(\phi+\pi/2)+\sin(\theta+2\pi/3)\sin(\phi+2\pi/3+\pi/2)+\sin(\theta-2\pi/3)\sin(\phi-2\pi/3+\pi/2)=(3/2)\sin(\theta-\phi)$, where '$\phi$' is the variable parameter and '$\theta$' represents the angular position of target 314. According to this embodiment, the signal generated in receiving element 316 approaches zero as the value of the variable parameter '$\phi$' approaches the value of the angular position $\theta$ of target 314. According to one embodiment, receiving element can be configured to output a signal to an electromagnetic interference filter or EMI filter 322 to remove interferences like, for example, high frequency interferences.

The signal from receiving element 316 can then be amplified by amplifier 324. Because there is a single channel and a single signal to amplify, inductive sensor 300 may be free from amplification mismatch and/or time mismatch. A demodulation unit 326 can be used to demodulate the signal. A low-pass filter 328 can be used to remove harmonics in the signal and an analog-to-digital converter or A/D 330 can be used to convert the signal to an analog signal. According to one embodiment, the output signal of the A/D 330 can be coupled to digital integrator and loop filter 332. The integration from loop filter 332 and the closed loop nature of the sensor 300 can result in a substantially small error signal, and in some cases, a zero error signal with a constant position or a constant speed of the target 314.

The output of loop filter 332 can represent the angular position of target 314 and a lookup table 334 can convert this output to excitation amplitudes and feed it back into DAC 306 while a post processing block 336 can convert this output to an output format usable by another device.

Similar to inductive sensor 200 described in FIG. 2, inductive sensor 300 can be configured to make adjustments to variable parameter '$\phi$' until the value of the signal received from receiving element 316 reaches a set value or is within a certain range or set range of values, or inductive sensor 300 can be configured to provide various variable parameters '$\phi$' representing a set of sampling values. The resulting signals received by receiving element 316 can be processed and their values can be used to calculate or extrapolate the angular position '$\theta$' of target 314.

Inductive sensor 300 can also be configured to output the value of variable parameter '$\phi$' or another signal or value representative of the approximate value of the angular position '$\theta$' of target 314.

Figure 4A:
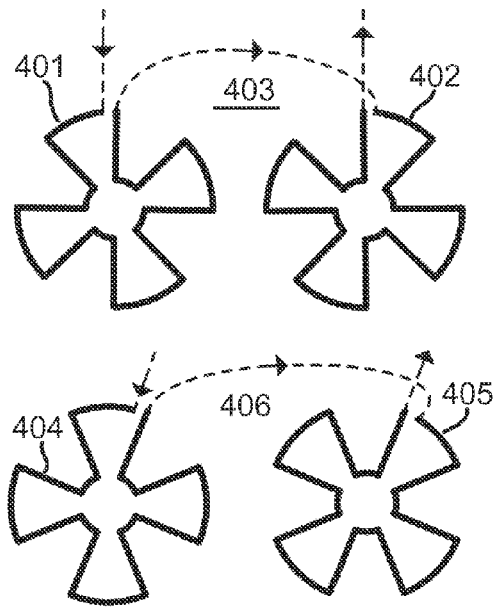
FIG. 4A schematically illustrates a pair of excitation elements in accordance with an embodiment of the present invention.

FIG. 4A schematically illustrates a pair of excitation elements in accordance with an embodiment. FIG. 4A illustrates a possible configuration for excitation elements in a two excitation element system similar to the two excitation element system described in FIG. 2. The number of, shape, position, and direction of windings of excitation elements 403 and 406 are intended as examples and are intended as non-limiting. The first element 403 comprises two windings 401 and 402. As described above, it is not a limitation that the inductive sensor use a two excitation element system, nor is it a limitation that the elements have two windings or any specific number of windings or any particular shape or geometry. One of ordinary skill in the art will recognize that a variety of different elements shapes, sizes, geometries, and element positioning can be designed and that the number of windings can vary. In one embodiment, a first winding 401 can have the geometry shown and can wind counter-clockwise and can be placed on a first layer of a multilayer PCB. A second winding 402 can be electrically coupled to the first winding 401 and can be placed on a second layer of a multilayer PCB. The second winding 402 can wind in a clockwise fashion, and can be angularly offset from the first winding 401. In one embodiment, first winding 401 and second winding 402 can be interleaved on different layers of a multilayer PCB. For example, first winding 401 can alternate between first and second layers of a multilayer PCB as it winds around in its shape, and second winding 402 can alternate between first and second layers of a PCB, for example in alternating sequence with first winding 401, as it winds around in its shape. One of ordinary skill in the art will recognize that a variety of different winding configurations can be engineered using a multi layer PCB or even single layer PCB.

A second excitation element 406 can also comprise two windings 404 and 405. The second excitation element can be similar to the first in terms of shape, winding direction, and apportionment across two layers of a multilayer PCB. Windings 404 and 405 can be angularly offset from the windings 402 and 403 and furthermore, winding 405 can be angularly offset from winding 404.

Figure 4B:
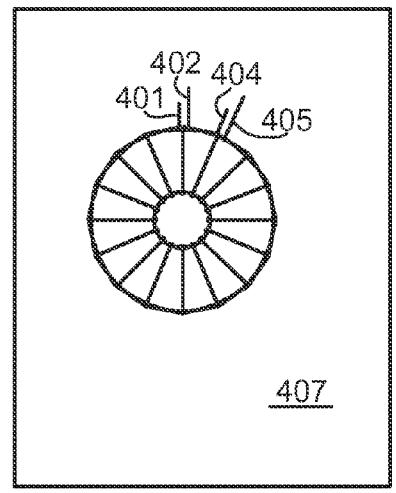
FIG. 4B schematically illustrates a combination of excitation elements in accordance with an embodiment of the present invention.

FIG. 4B schematically illustrates a combination of excitation elements in accordance with an embodiment. FIG. 4B shows overhead view of an example of the excitation elements 403 and 406 described in FIG. 4A stacked on a portion of a multilayer PCB 407 and positioned with a common center. It is noted that excitation elements 403 and 406 are not electrically connected to each other.

Figure 4C:
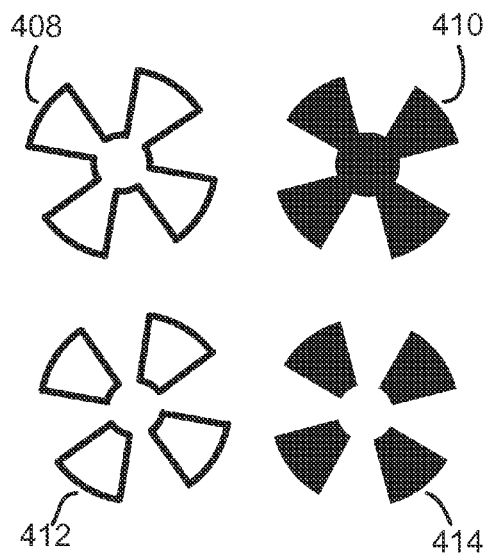
FIG. 4C schematically illustrates a various targets in accordance with various embodiments of the present invention.

FIG. 4C schematically illustrates examples of various targets in accordance with various embodiments. Targets 408, 410, 412, and 414 are shown as examples of targets which could be used in conjunction with excitation elements 403 and 406 described in FIG. 4A. Target 408 shows a single, hollow, conductive, closed loop target. Target 410 shows a single, conductive, filled target. Target 412 shows four hollow, conductive, closed loops. Target 414 shows four filled conductive shapes. Each of targets 408, 410, 412, and 414 comprise a conductive material and can be attached to or integral with a rotatable part of a system for which it is desirable to know the part's angular position. The basic shape and geometry of targets 408, 410, 412, and 414 can be made to approximately match the shape and geometry of excitation elements, however, it is not a limitation that the target of a sensor device have a specific shape, geometry, conductive material, or position.

Figure 4D:
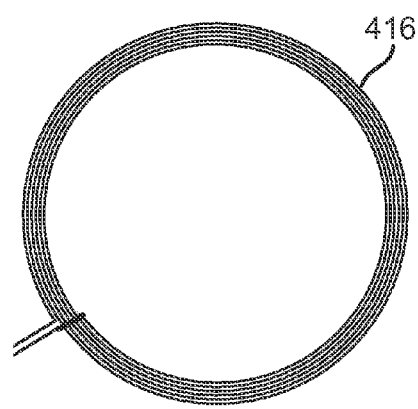
FIG. 4D schematically illustrates a receiving element in accordance with an embodiment of the present invention.

FIG. 4D schematically illustrates a receiving element in accordance with an embodiment. Receiving element 416 can be of a spiral shape and can be placed on the same multilayer PCB as excitation elements or can be placed separately.

Figure 4F:
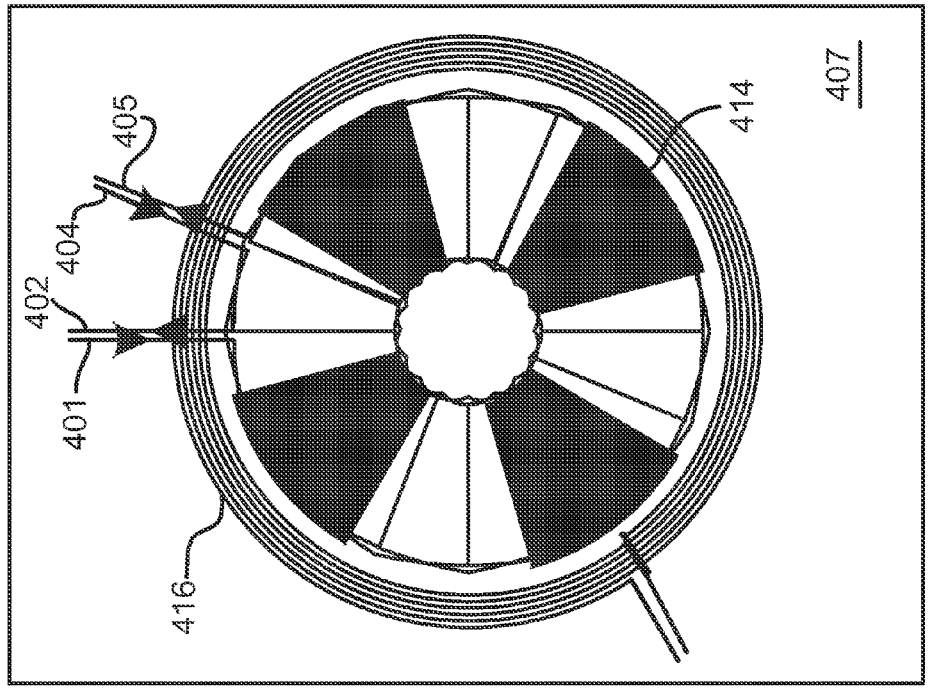
FIG. 4F schematically illustrates a combination of excitation elements, target, and receiving element in accordance with an embodiment of the present invention.
Figure 4E:
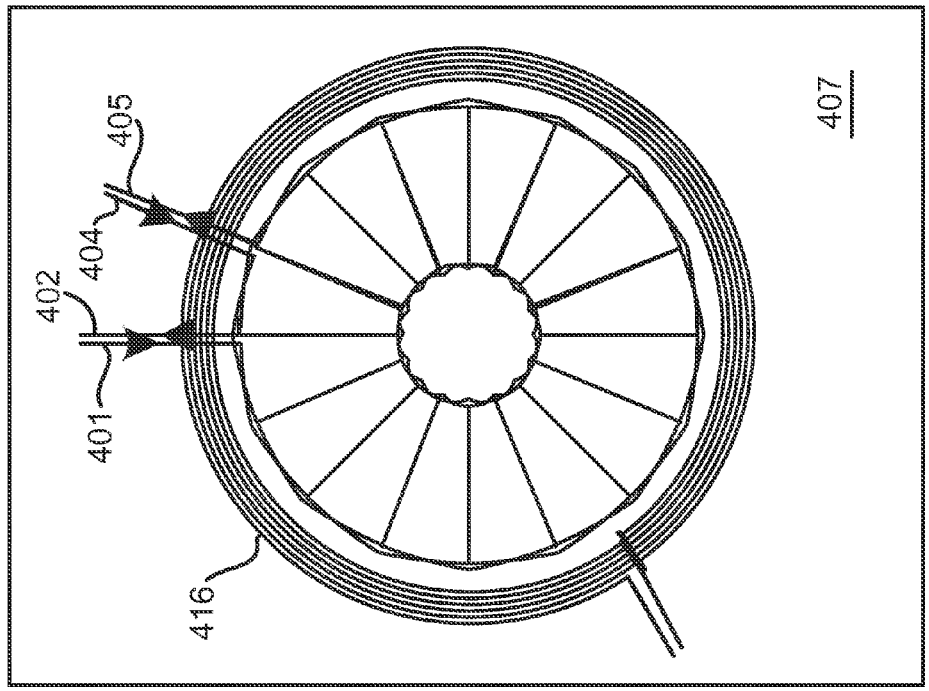
FIG. 4E schematically illustrates a combination of excitation elements and receiver element in accordance with an embodiment of the present invention.

FIG. 4E schematically illustrates a combination of excitation elements and receiving element in accordance with an embodiment. FIG. 4E shows an overhead view a portion of multilayer PCB 407 having windings 401 and 402 forming a first excitation element, winding 404 and 405 forming a second excitation element and winding 416 forming a receiving element.

FIG. 4F schematically illustrates a combination of excitation elements, target, and receiving element in accordance with an embodiment. FIG. 4E shows an overhead view a portion of multilayer PCB 407 having windings 401 and 402 forming a first excitation element, winding 404 and 405 forming a second excitation element and winding 416 forming a receiving element. In one embodiment, target 414 can be positioned substantially concentric with the excitation elements and positioned above and proximate to the multi-layer PCB such that it can affect electromagnetic fields generated by excitation elements as a function of its angular position.

Figure 5:
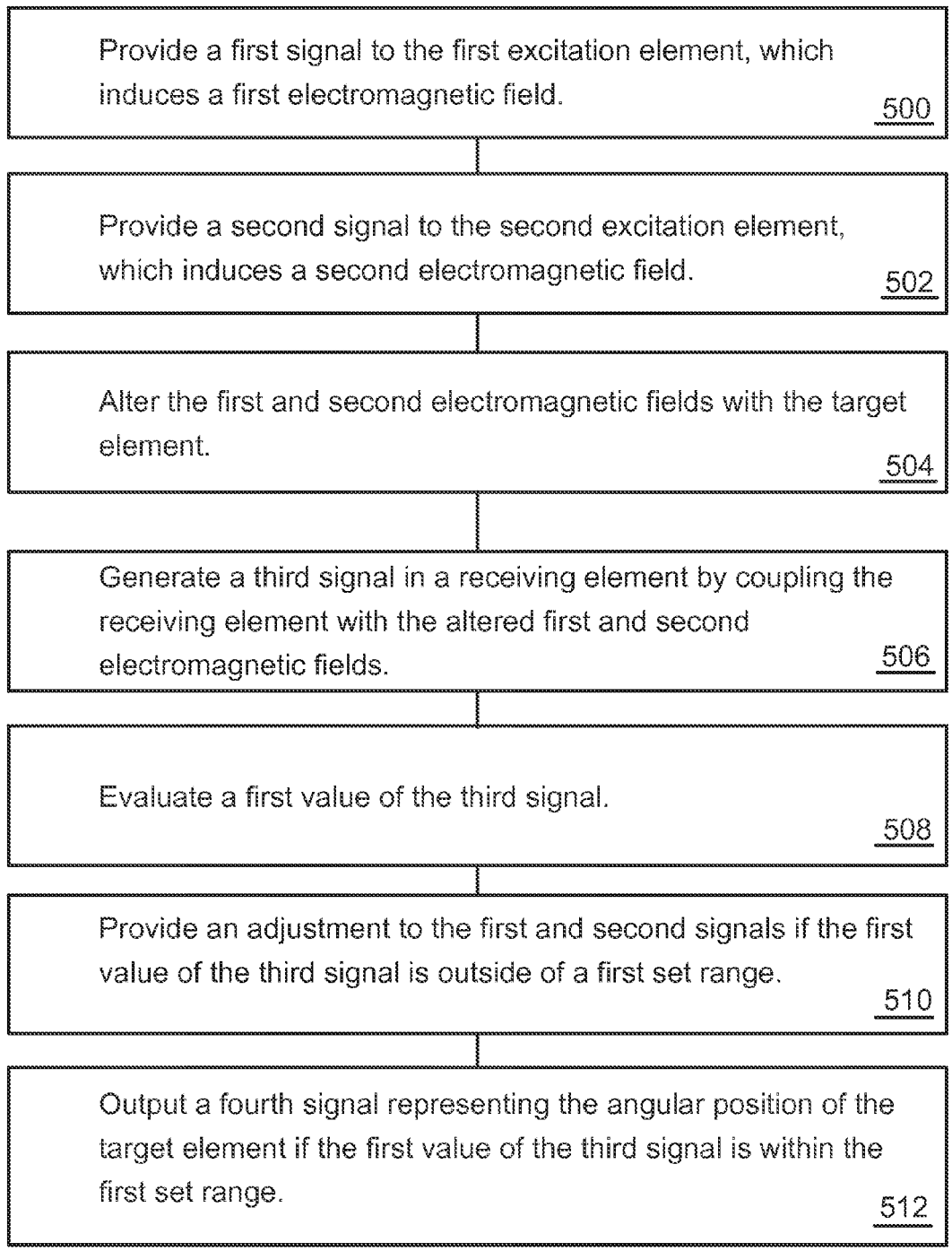
FIG. 5 illustrates a diagram describing a method for sensing an angular position of a target in accordance with an embodiment of the present invention.

FIG. 5 illustrates a diagram describing a method for sensing an angular position of a target element. According to one embodiment a first act 500 can include providing a first signal to a first excitation element and inducing a first electromagnetic field. A second act 502 can include providing a second signal to a second excitation element and inducing a second electromagnetic field. A third act 504 can include altering the first and second electromagnetic fields with the target element, wherein the target element is configured to alter the first and second electromagnetic fields as a function of the angular position of the target element. A fourth act 506 can include generating a third signal in a receiving element by coupling the receiving element with the altered first and second electromagnetic fields. A fifth act 508 can include evaluating a first value of the third signal. A sixth act 510 can include providing an adjustment to the first and second signals if the first value of the third signal is outside of a first set range. A seventh act 512 can include outputting a fourth signal if the first value of the third signal is within the first set range, wherein the fourth signal can represent the angular position of a target element.

In an alternative embodiment, acts 500-508 can be performed as described. Following act 508, an adjustment to the first and second signals is automatically applied. Following the adjustment, acts 500-508 can be repeated. Subsequently, the first value of the third signal obtained using the first and second signals, and the first value of the third signal obtained using the adjusted first and second signals, can be used to calculate and output a fourth signal representing the angular position of the target element.

Figure 6:
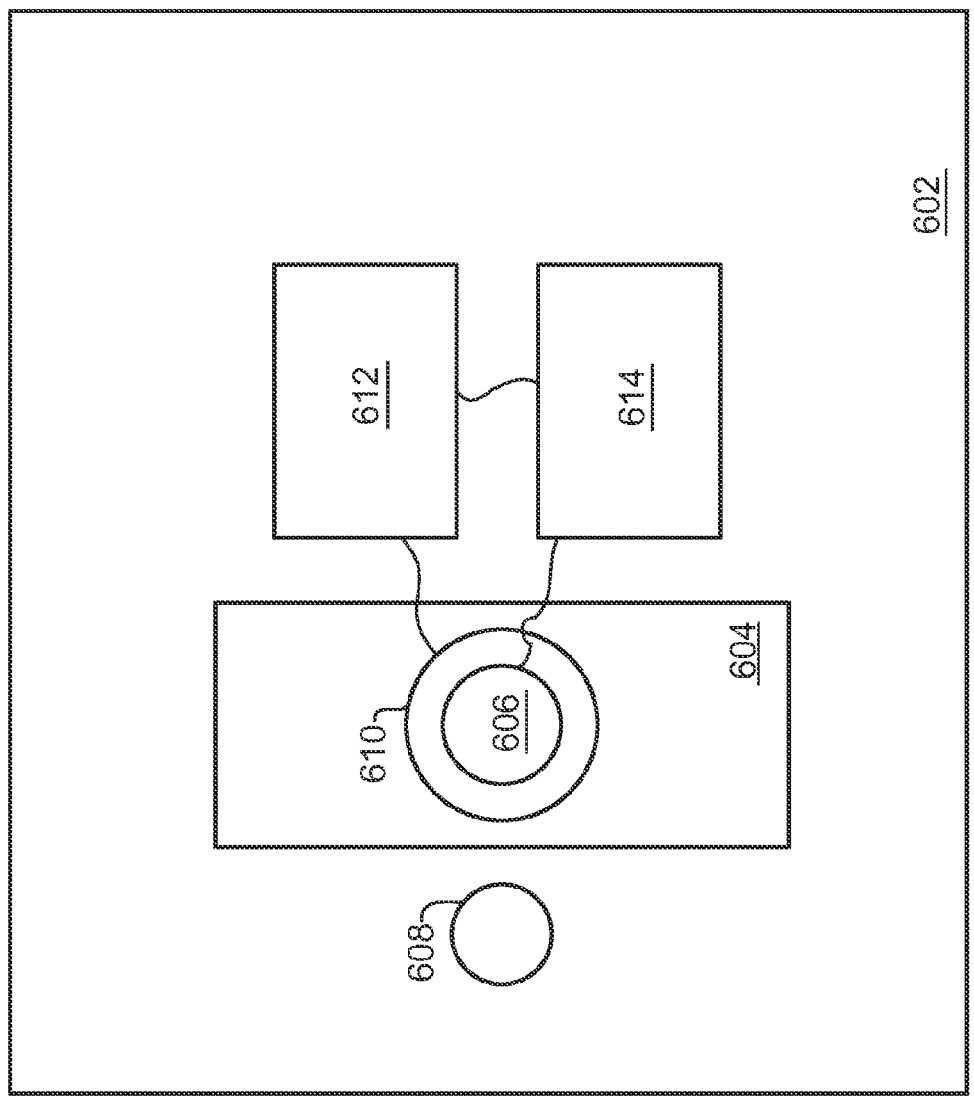
FIG. 6 schematically illustrates a vehicle implementing an inductive sensor in accordance with an embodiment of the present invention.

FIG. 6 schematically illustrates a vehicle implementing an inductive sensor in accordance with an embodiment of the present invention. According to one element, a vehicle 602 includes a printed circuit board 604 which can have a plurality of excitation elements 606 and a receiving element 610 coupled to it. The plurality of excitation elements 606 are capable of generating electromagnetic fields in response to signals provided by an excitation control 614 which can be coupled to an the plurality of excitation elements 606. Receiving element 610 can be coupled to a signal processor 612. Signal processor 612 and excitation control 614 can be coupled together and signal processor 612 can be capable of adjusting the signals provided by excitation control 614 to the plurality of excitation elements 606. The plurality of excitation elements 606 and receiving element 610 can be placed proximate to a rotor 608. Rotor 608 can be coupled to or integral with a component of vehicle 602. As an example, the component could be coupled to or integral with an acceleration pedal, a brake pedal, a throttle, a suspension, a steering wheel, headlights, actuators, or any of various other components of the engine, transmission or vehicle. Rotor 608 can be rotatable relative to the plurality of excitation elements 606 and can be coupled to or integral with a target capable of affecting the electromagnetic fields generated by excitation elements 606 as a function of its angular position relative to the plurality of excitation elements 606. Receiving element 610 is capable of generating a signal in response to the first and second electromagnetic fields as affected by rotor 608. Signal processor 612 is capable of receiving the signal generated by receiving element 610 and is capable of evaluating a first value of the signal generated by the receiving element, providing an adjustment to the signals provided by excitation control, and determining the angular position of rotor 608 when the first value of the signal generated by receiving element 610 reaches a first set value or first set range of values.

In an alternative embodiment, signal processor 612 can be capable of providing a set of sampling signals to excitation control 614. Signal processor 612 can then use the resulting signals received by receiving element 610 and their associated values to calculate or extrapolate the angular position of target 608.

The embodiments described herein are used to illustrate some potential physical designs and electronic configurations that can be used. Particular physical designs and electronic configurations selected can be selected to meet the needs or desires for a particular application. Other electronic components and other configurations can be used without departing from the scope of the concepts described herein.

Many different aspects and embodiments are possible. Some of those aspects and embodiments are described below. After reading this specification, skilled artisans will appreciate that those aspects and embodiments are only illustrative and do not limit the scope of the present invention.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electronic device comprising:
   an excitation control configured to receive a variable first parameter and configured to generate a first signal as a function of the variable first parameter and a second signal as a function of the variable first parameter;
   a first excitation element coupled to the excitation control and configured to receive the first signal and configured to generate a corresponding first electromagnetic field;
   a second excitation element coupled to the excitation control and configured to receive the second signal and configured to generate a corresponding second electromagnetic field;
   a target positioned within the first and second electromagnetic fields and configured to alter the first and second electromagnetic fields as a function of its angular position;
   a receiving element positioned within the first and second electromagnetic fields and coupled to the first and second excitation elements and configured to generate a third signal in response to the first and second electromagnetic fields as altered by the target; and
   a signal processor coupled to the receiving element and coupled to the excitation control, wherein the signal processor is configured to receive the third signal and provide an updated variable first parameter to the excitation control, and wherein the signal processor is also configured to generate a fourth signal representing the angular position of the target based on the third signal and the variable first parameter.

2. The electronic device of claim 1, wherein the receiving element is coupled to the first and second excitation elements via electromagnetic induction.

3. The electronic device of claim 1, wherein there is only one receiving element.

4. The electronic device of claim 1, wherein the first and second excitation elements comprise electrically conductive traces comprising lines and curves having periodic bends.

5. The electronic device of claim 1, wherein the receiving element comprises a planar spiral conductive trace.

6. The electronic device of claim 1, further comprising a third excitation element coupled to the excitation control and configured to receive a fifth signal and generate a corresponding third electromagnetic field, and wherein the excitation control is further configured to generate a fifth signal as a function of the variable first parameter, and wherein the target is also positioned within the third electromagnetic field and is also configured to alter the third electromagnetic field as a function of its angular position, and wherein the receiving element is positioned within the third electromagnetic field and configured to generate a signal in response to electromagnetic induction by the first, second and third electromagnetic fields.

7. An electronic device comprising:
   a plurality of excitation elements having a common shape and configured to generate electromagnetic fields;
   a coupler element positioned within the electromagnetic fields and configured to alter the electromagnetic fields as a function of the angular position of the coupler element, and wherein a shape of the coupler element substantially matches the common shape of the excitation elements; and
   a receiving element configured to generate a signal in response to the electromagnetic fields as altered by the coupler element, wherein a value of the signal represents an approximate angular position of the coupler element.

8. The electronic device of claim 7, wherein there is only one receiving element.

9. The electronic device of claim 7, wherein the plurality of excitation elements comprise conductive planar windings on a printed circuit board.

10. The electronic device of claim 7, wherein the plurality of excitation elements comprise conductive planar windings with periodic bends.

11. The electronic device of claim 7, wherein the receiving element comprises a conductive planar winding on a printed circuit board.

12. The electronic device of claim 7, wherein the receiving element comprises a conductive planar winding in a spiral shape.

* * * * *